Oct. 25, 1966  C. D. HOGG  3,281,080
IRRIGATION SYSTEM
Filed Nov. 14, 1963  6 Sheets-Sheet 1
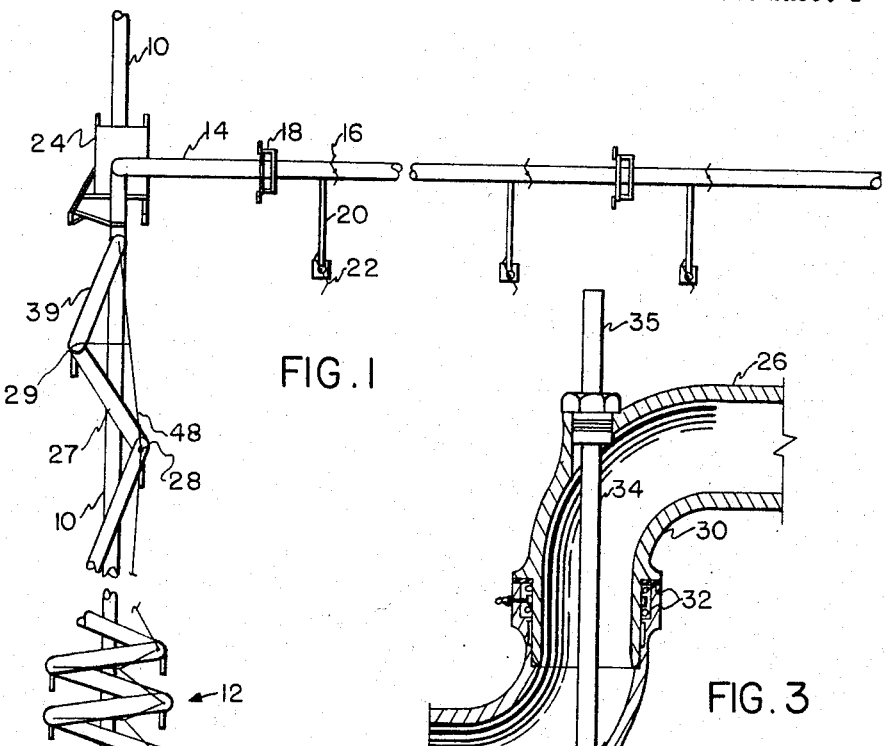
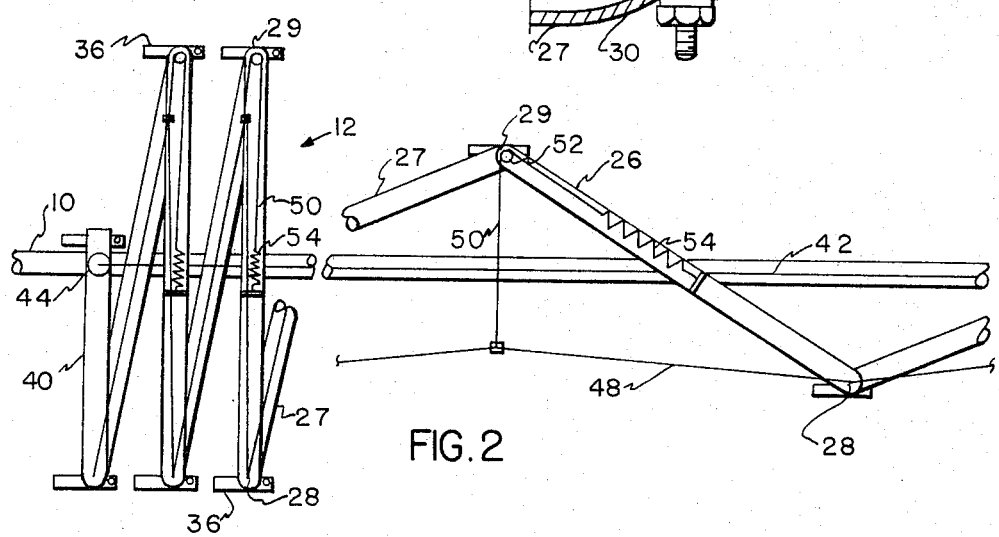
CARL D. HOGG
INVENTOR.
BY *C.W. McAfee*
Atty.

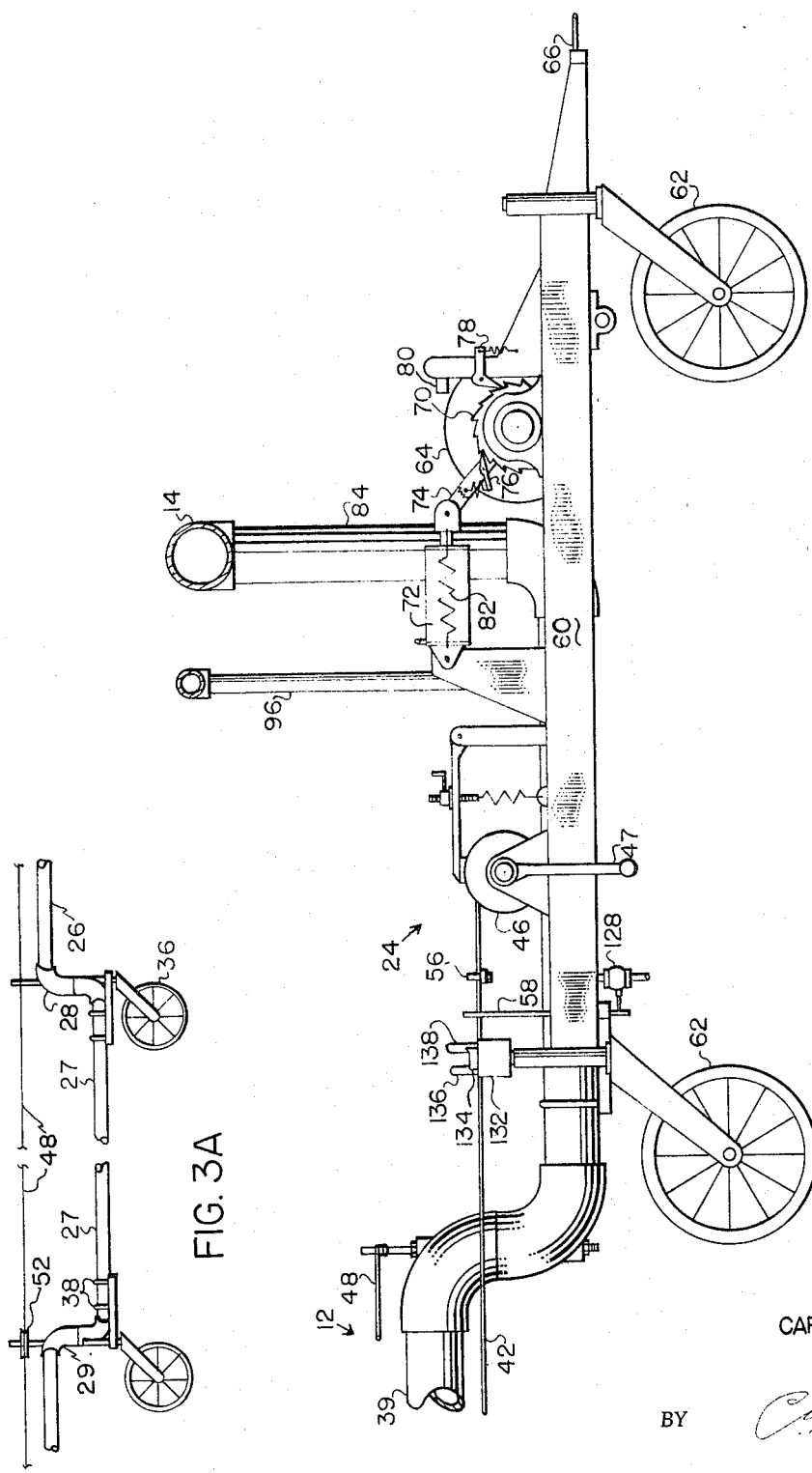

Oct. 25, 1966  C. D. HOGG  3,281,080
IRRIGATION SYSTEM
Filed Nov. 14, 1963  6 Sheets-Sheet 3

CARL D. HOGG
INVENTOR.

BY [signature]
Atty.

Oct. 25, 1966  C. D. HOGG  3,281,080
IRRIGATION SYSTEM

Filed Nov. 14, 1963  6 Sheets-Sheet 4

CARL D. HOGG
INVENTOR.

BY *C. W. Coffee*
   A Ty.

CARL D. HOGG
INVENTOR.

United States Patent Office 3,281,080
Patented Oct. 25, 1966

3,281,080
IRRIGATION SYSTEM
Carl D. Hogg, Clovis, N. Mex., assignor, by mesne assignments, to The J. B. Knight Co., Inc., Brownfield, Tex., a corporation of Texas
Filed Nov. 14, 1963, Ser. No. 323,769
14 Claims. (Cl. 239—212)

This invention relates to agricultural irrigation and more particularly to agricultural irrigation by sprinkling water upon the land to be irrigated.

Much of the arid land in the United States today is irrigated by sprinkler irrigation systems. In these systems the water is pumped from a source such as an underground well through main pipes and from the main pipes into the lateral pipes; the lateral pipes having sprinklers thereupon to discharge the water upon the land to be watered.

Various moving systems have been developed for moving these lateral pipes from one position to another. Often this is done by diverting the water from a lateral and then moving the lateral to a new position. Thereafter, water is turned into the lateral, again sprinkling it upon the ground. Another system is to move the lateral continuously while water is being sprinkled therefrom. One of the problems encountered in moving the system continuously while watering is the difficulty of transferring the water from the main pipe into the moving lateral pipe. Some of the commercial systems on the market solve this problem by having the lateral pipe circle a connection by which the lateral pipe is connected to the main pipe. This has the disadvantage of watering a circular area. Inasmuch as most agricultural land is in rectangles, this offers a certain amount of disadvantage in itself.

I have devised a system for transferring the water from the main pipe into the lateral pipe using a series of pivot pipes so that these are pivoted to one another at their ends. Therefore, it is possible to move the ends in a linear path so that the lateral pipe may be transversed across the field in rectilinear movement rather than rotating about one end.

In addition to this, I have invented a power system whereby the water pressure system is pulsed or surged to a motor so as to move the system. I have invented a valve particularly adapted to perform this function. Therefore, it is not necessary to have a valve mechanism at the individual motors, but it is necessary to have only a single valve for the entire system.

Furthermore, I have developed a clutch system for maintaining the alignment of the system. In general, sometimes the supporting and driving vehicles of the system will get out of alignment getting ahead of other vehicles, making it necessary to bring it into alignment. If the vehicle which is ahead of the other vehicles is slowed down of course, alignment will result. Therefore, if the driving mechanism for the vehicle that is ahead is disengaged, the other vehicles will come into line.

However, should misalignment become so serious that there is danger of damaging the pipe, it is desirable to cease the movement of all vehicles. A mechanism has been provided for this purpose also.

An object of this invention is to provide an agricultural system for sprinkling water upon the land to be irrigated.

Another object of this invention is to provide such a system which will move while watering.

Another object is to provide a means for transferring water from a stationary pipe to a moving pipe.

Another object is to provide means for maintaining alignment of the moving pipes which moves normal to its axis.

A further object of this invention is to provide a system for moving a line of vehicles by water motor utilizing the water pressure of the irrigation system for this purpose.

A further object is to provide an improved valve for controlling a plurality of such motors.

A further object is to provide an alignment system whereby misalignment of the moving pipe will cause the movement of the pipe to cease.

Still further object is to provide a clutch mechanism for maintaining the pipe in alignment.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawing, the different views of which are not necessarily to the same scale, in which:

FIG. 1 is a plan view of the entire system partially broken for clarity.

FIG. 2 is a plan view of the portion of the pivot pipe system partially broken for clarity.

FIG. 3 is a sectional view showing one pivot joint.

FIG. 3A is a view of the pivot pipe showing the caster wheels attached to the pivot pipes.

FIG. 5 is an elevational view of the moving vehicle.

Figure 4:
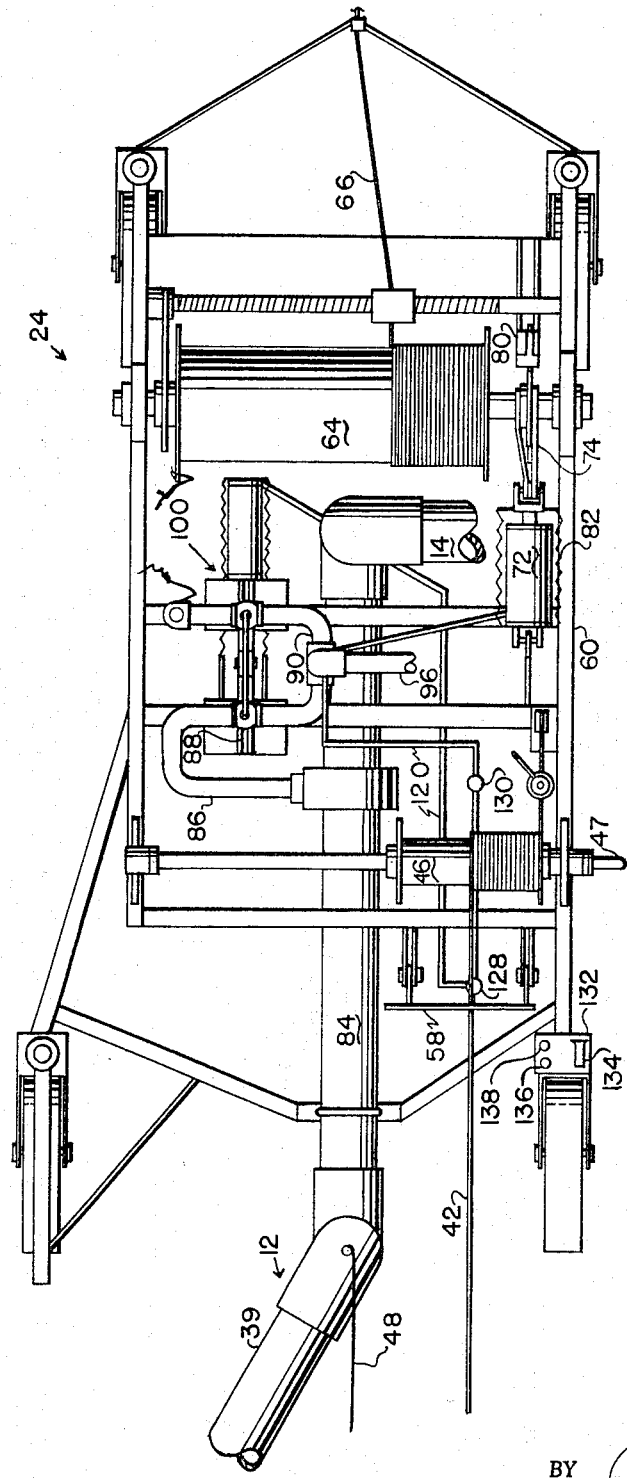
FIG. 4 is a plan view of the moving vehicle.

Referring to the drawings, particularly to FIG. 1, it may be seen that this system is intended to be used with a main pipe or fixed pipe 10 which is connected to a source of water under pressure and adapted to carry water under pressure. Pivot pipe assembly 12 transfers the water from the fixed pipe 10 to the movable pipe or lateral pipe 14. The pipe 14 has a plurality of sprinklers 16 attached thereto. Likewise, the movable pipe 14 has a plurality of vehicles 18 which are attached to it supporting same to move same along the field. Further, the pipe 14 has a plurality of trail tubes 20 attached to it so that additional trail sprinklers 22 may be used as is known to the art. The pivot pipe assembly 12 is attached to a pivot vehicle 24, so called because it is attached to the pivot pipe.

Referring now to FIGS. 2, 3, 3A and 4 for details of the pivot pipe assembly 12, it may be seen that the pivot pipe assembly is comprised of a plurality of rigid upper pivot pipes 26 and rigid lower pivot pipes 27. Each pivot pipe has a span pivot 28 on one end thereof and a painter pivot 29 on the other. Each of the pivot pipes extends horizontally at all times and has an elbow 30 so that the pivot itself rotates about a vertical axis. The elbows on each pivot pipe extend the same way so that the lower pivot pipe 27 has the elbows 30 turning upward and the adjoining upper pivot pipe 26 has the elbows 30 turning downward. Each pivot is mounted for rotation and has suitable seals 32 about the joint. The elbow of the upper pivot pipe 26 telescopes into the elbow of the lower pivot pipe 27 and the seals 32 form a watertight joint. Rod 34 extends from one elbow to the other along the axis of the pivot to prevent the elbows becoming disengaged because of the water pressure therein. The rod 34 likewise is mounted to allow for rotation. Thus it may be seen that the pivots 28 and 29 not only provide a means for connecting the pivot pipes 26 and 27 in series water transferring relation, but also provide the means for connecting them in a series structural relation. Caster wheel 36 is attached by suitable clamp 38 to each of the lower pivot pipes 26 (FIG. 3A). Thus it may be seen that at each pivot 28 or 29 there is a ground engaging load bearing support wheel 36. The wheel 36 does support the pivot pipes 26 and 27 and all of the wheels 36 support the entire pivot pipe assembly 12. One end of the pivot pipe assembly 12 is attached to the pivot vehicle 24. The pivot pipe 39 that is attached to the pivot vehicle 24, is approximately half the length of the normal pivot pipes 26 and 27 which are of the same length. The fixed pivot pipe 40 on the other end of assembly 12 is removably connected to a vertically extending nipple extending upward from the fixed pipe 10. The fixed pivot pipe 40 likewise, is approximately half the length of the remainder of the pivot pipes 26 and 27. There is a caster wheel at the end of this pipe 40 for reasons to be explained later.

Long cable 42 extends from fixed pivot 44 to winch 46 attached to the pivot vehicle 24. The fixed pivot 44 is so named because it is fixed removably connected to the vertical nipple upon the fixed pipe 10.

Span cable 48 extends from one span pivot 28 on one end of each upper pivot pipe 26 to a second span pivot 28 on the adjacent upper pivot pipe 26. Therefore, it may be seen that the span cable 48 connects to one span pivot 28 on each of the upper pivot pipes 26. The length of the span cable 48 between connections to the span pivots 28 is shorter than the two pivot pipes 26 and 27 it spans. Therefore, when the pivot pipes are being unfolded it is impossible for the pivot pipes to be straightened out and be aligned. Therefore, it is impossible for the three consecutive pivots 28 and 29 to be aligned. This prevents consecutive caster wheels 36 from becoming aligned and therefore, there is a triangular or stable support for the pivot pipe assembly 12 at all times. Furthermore, the force to unfold subsequent joints of pivot pipes 26 and 27 is transferred through the span cable 48 and not through the pivot pipes 26 and 27 themselves.

Painter 50 is attached to the midpoint of each link of the span cable 48. The painter extends around pulley 52 attached to each painter pivot 29 to which the span cable 48 is not attached. The end of the painter 50 is attached to spring 54 which is attached to the upper pivot pipe 26. Therefore, it may be seen that regardless of whether the pivot assembly 12 is extended or collapsed, the span cable 48 is folded with the pivot pipes and therefore, it is not loose to become tangled. Each rod 34 has pintle 35 for attachment of cable 48 or pulley 52.

Operation of the pivot pipe assembly 12 is explained as follows. With all the pivot pipe in the folded relationship, the pivot vehicle 24 would be rather close to the fixed pivot 44 and all the pivot pipes 26 and 27 folded between the pivot vehicle 24 and the fixed pivot 44.

With the winch 46 free to pay out the long cable 42, the pivot vehicle 24 is moved forward by means explained later. As the vehicle moves forward, the first joint of pivot pipe 39 will unfold. The painter pivot 29 will move inward toward the fixed pipe 10 and this will continue until the first joint of pivot pipe 39 extends approximately directly behind the pivot vehicle 24 at which time the painter pivot 29 will follow the pivot pipe 10. During this time, the first joint of lower pivot pipe 27 has been unfolding. When the first lower pipe 27 is completely unfolded, the span cable pivot 28 will begin moving. The span cable pivot 28 will not be pulled by the tension in the pivot pipe itself, but by the tension in the span cable 48. Therefore, it may be seen that as the pivot vehicle 24 progresses, that each subsequent joint of pivot pipe is unfolded by tension in the span cable 48 from the previous joint and not by continued tension in the pivot pipe itself. After the entire length of long cable 42 is played out, stop 56 in the form of a cable clamp, contacts lever 58 to stop the pivot vehicle 24, by means explained later. At that time, the fixed pivot 44 is manually disconnected from the nipple on the fixed pipe 10 and the long cable 42 is drawn in by operation of hand crank 47 on the winch 46. As the long cable 42 is pulled in, it will be seen that the pivot pipe assembly 12 is transformed from an extended relationship to a folded relationship. The span cable 48 is folded with the pipes through the action of the painter 50 and the painter spring 54. After the pivot pipe assembly is again transformed into the folded relationship, it is attached to another vertical extending nipple on the pivot pipe 10 and the process repeated. Thus, it may be seen that I have provided means for transferring water from a fixed pipe 10 into a movable pipe 14, the movable pipe being connected to the pivot vehicle 24.

Referring now to FIGS. 4 and 5, the pivot vehicle 24 has a frame 60 to which is attached a plurality of ground engaging wheels 62. As may be seen in FIG. 1, the pivot vehicle 24 straddles the fixed pipe 10 and therefore, the fixed pipe 10 acts as a guide therefor. Moving winch 64 is mounted on the forward portion of the frame 60. Cable 66 extends from the moving winch 64 to a stake set in the ground to move the pivot vehicle forward. Such forward cable movement is well known and is shown in the patents to Turner, 2,122,596, and Ford, 2,918,800. Ratchet wheel 70 is attached to one end of the moving winch 64 and the winch is rotated by water motor 72. The water motor oscillates arm 74 which is pivoted to the axle of the moving winch 64 and ratchet wheel 70. The arm 74 carries the spring biased arm dog 76 which rotates the ratchet in a clockwise direction as seen in FIG. 5, each time the arm moves in a clockwise direction. Spring biased frame dog 78 engages the ratchet to prevent counterclockwise motion. The length of the stroke of the arm 74 is limited by adjustable stop 80. The water motor 72 has only one power stroke, that in the forward direction to oscillate the arm 74 in a clockwise direction. The arm 74 is returned by springs 82 extending alongside the cylinder of the water motor 72.

Water conduit 84 is attached to the frame 60 of the pivot vehicle 24 and transfers water from the pivot pipe assembly 12 to the movable pipe 14. Surge feed line 86 extends from the conduit 84 to pressure valve 88, FIGS. 4, 6 and 7. The discharge line 90 connects the discharge of the pressure valve 88 to the intake of the exhaust valve 92. Pressure valve 88 and exhaust valve 92 are poppet type valves which are activated by vertically extending plungers 94 extending from the valves. The valves are attached to the frame 60 by suitable connections. Surge line 96 attaches to the discharge line 90. The intake of water motor 72 is attached to the surge line 96.

Figure 6:
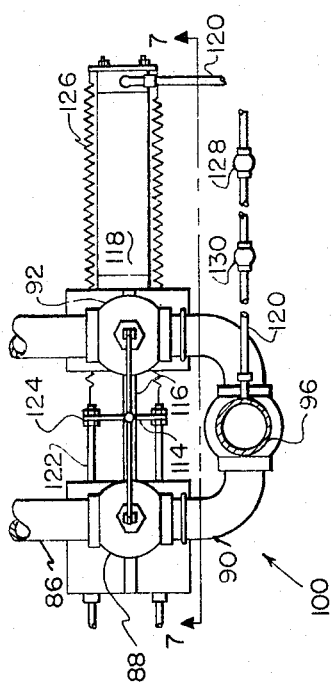
FIG. 6 is a plan view partially schematic showing the surge valve and its actuator.
Figure 7:
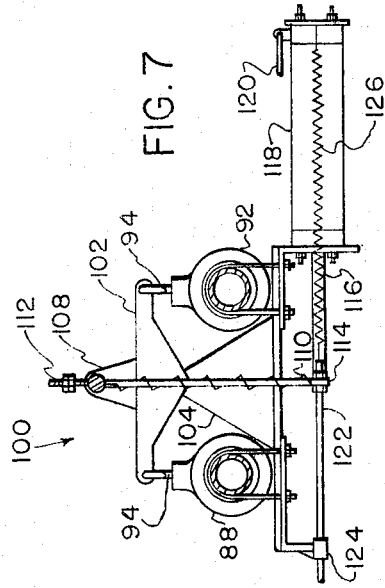
FIG. 7 is a sectional view taken on line 7—7 of FIG. 6 of the surge valves.

Referring more particularly to FIGS. 6 and 7 for details of the surge valve assembly 100, the plungers 94 of the valve 88 and 92 are operated by yoke 102 which is pivoted to element 104 also attached to the frame halfway between the valves. The ends of the yoke 102 are connected to the plungers 94. Bar 108 extends upward from the yoke 102 and there is connected thereto a spring 110 and rod 112. The other end of the spring and rod are connected to crosshead 114 which is carried on the piston rod 116 of the actuator cylinder 118. Control line 120 connects the actuator cylinder 118 to the surge line 96. The crosshead is mounted to reciprocate with guide rods 122 in bearings 124 so that the crosshead reciprocates in a horizontal path below the yoke 102. Springs 126 move the crosshead in the direction opposite from the direction water pressure in the cylinder 118 forces it.

To explain the operation, the mechanism will be described from the starting position with the pressure valve 88 closed and the exhaust valve 92 open and the water being discharged from the cylinder 118 through the control line 120 and through the exhaust valve 92. The exhaust from the exhaust valve 92 is vented to waste. Therefore, as the crosshead 114 is retracted by the action of the springs 126, it will pass a point where the pull on the yoke 102 through the bar 108 will be passed dead center so that the yoke is snapped into the other position opening pressure valve 88 and closing exhaust valve 92. It will be understood that control line 120 is of small diameter so that there is a controlled flow of the water from the cylinder 118 so that the movement of the crosshead 114 is retarded. If desired, the flow in the control line 120 may be controlled by a needle valve, however, this is not shown in the drawing for simplicity. As soon as the yoke 102 snaps to its new position, the crosshead 114 reverses its direction of movement, being forced to the opposite direction by the water pressure in the control line 120. Again, the movement is not fast inasmuch as the flow of water through the control line 120 is throttled as discussed above. After a certain period of time, the crosshead 114 will again cross dead center and the yoke will be snapped into the other position by the springs 112 and rod 116.

Therefore, it may be seen that I have provided a simple valve arrangement whereby the water pressure within surge line 96 is alternately increased to a high pressure and then decreased to a low pressure so that water flows to the various water motors connected thereto to operate them first in one direction and then permit them to exhaust back through the exhaust valve 92. Any number of water motors may be connected to the surge line 96 and it is not necessary for each water motor to have its own control valves, but these valves 88 and 92 operate any number of motors which may be attached thereto. Also, it will be seen that each of the motors is operated at the same rate and are not dependent upon the rate of operation for the pressure upon the individual motor.

Therefore, it may be seen (since the water motor 72 is connected to the surge line 96) that each time the pressure is built up in the surge line 96 that it causes the arm 74 to oscillate in a clockwise direction rotating the winch 64 and reeling in the cable 66 to move the pivot vehicle 24 forward. Each time the pressure is released in the surge line 96, the spring 82 causes the water within the water motor 72 to be exhausted back through the surge line 96 and out the exhaust valve 92. Also it will be understood the surge line 96 does not necessarily have all water expelled from it, but only the water adjacent to the surge valve assembly 100 is all that is exhausted and therefore, the same surge line inasmuch as most of the water in the line merely surges from one direction to the opposite direction.

Inasmuch as one of the purposes of the control line 120 is to throttle the flow of the water as it extends from the surge line 96 to the actuator cylinder 118 it can be quite long. Therefore, it may be extended over adjacent to winch 46. Therefore, when the stop 56 contacts the lever 58, the lever may operate a pivot pipe stop valve 128 which closes the line 120. Therefore, it may be seen that anytime the line 120 is closed so there is no flow of water through it, that the actuator ceases to operate ceasing to snap the yoke 102 from one position to another and therefore, there is no surge of water in the surge line 96 and therefore, the pivot vehicle 24 no longer moves forward. Therefore, it may be seen that when the pivot pipe assembly 12 is fully expanded and the stop 56 contacts the lever 58, that the pivot vehicle 24 stops.

At the time the stop 56 actuates the lever 58 and thereby actuating the pivot pipe stop valve 128, at the same time the lever actuates a switch (not shown) in control box 132. Through batteries also contained in the control box 132, when the stop 56 moves the lever 58 it also causes the klaxon 134 to sound and the red light 136 to shine. If the lever is in the normal position, the control box causes green light 138 to shine. Therefore, if the operator of the equipment is within audible distance thereof he knows that it is time to change the pipe. If not, by observing whether a green light 138 or red light 136 is showing, he can know whether it is time to change the pipe or not.

Likewise, an additional misalignment stop valve 130 is contained within the control line 120. Therefore, when this valve is controlled by mechanism to be explained later in a similar manner as described above, there will no longer be any water pressure surges within the surge line 96.

The winch 46 has been illustrated as a hand operated winch and of course it will be understood that it could be powered from any convenient source. A brake has been shown associated with the winch 46 which permits paying out the long cable 42, but which will not permit it to be wound in unless the brake is purposely and manually released. It will be understood that many additional embellishments could be included, but are neither shown nor described for purposes of simplicity.

Figure 8:
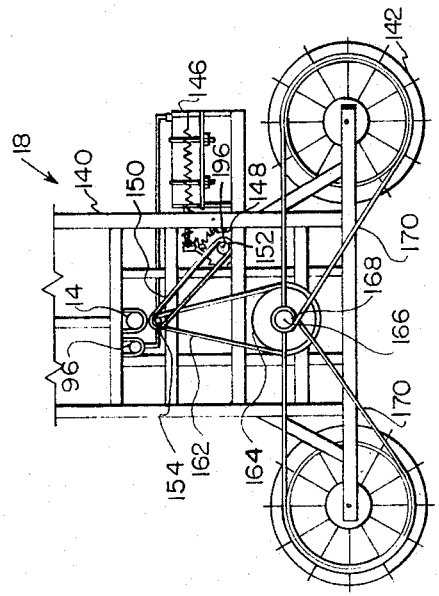
FIG. 8 is an elevational view of one vehicle with the top portion removed for clarity.
Figure 9:
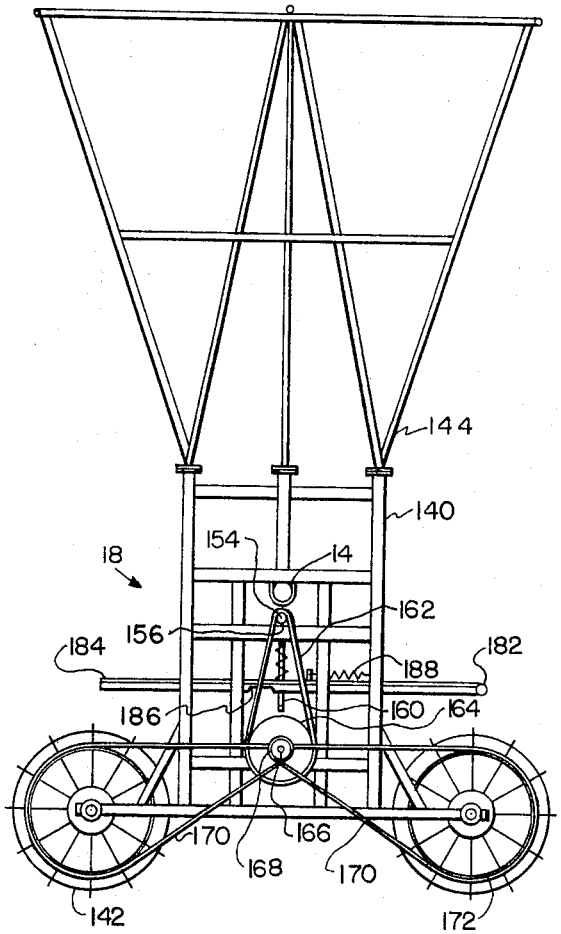
FIG. 9 is a side elevational view of one of the vehicles.
Figure 10:
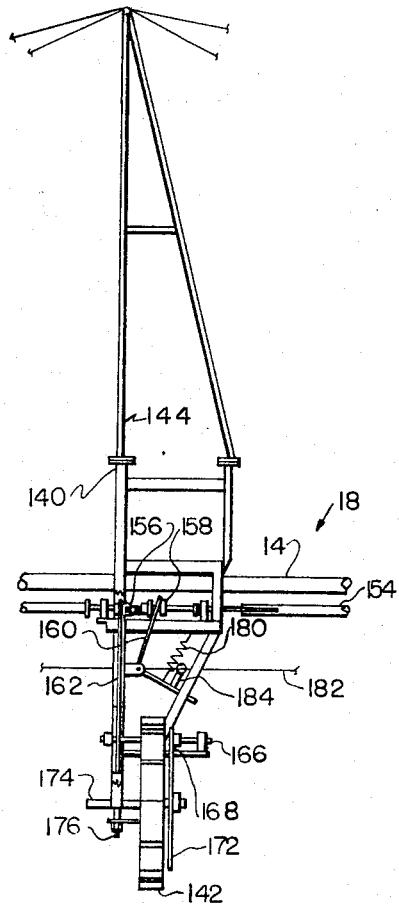
FIG. 10 is a front view of one of the vehicles.

Referring now more particularly to the FIGS. 8, 9, and 10 for details of the vehicles 18 which support the movable pipe 14, it will be seen that each vehicle includes frame 140 having two ground engaging wheels 142. Also, the vehicles have a tower structure 144 from which cables extend to the movable pipe 14 to support same. As stated before, the movable pipe 14 is connected by water conduit 84 on the pivot vehicle 24 to the pivot pipe assembly 12 and thus to the fixed pipe 10 and therefore, there is provided to the movable pipe 14 a supply of water under pressure. Also, the surge line 96 extends alongside of the movable pipe 14 to supply water for water motors to power them. One of the vehicles (FIG. 8) will be designated as the power vehicle and has a water motor 146 mounted thereon. The water motor is connected to the surge line 96. Therefore, when there is power, the water motor rotates an arm which acts through a dog to rotate ratchet 148. The arm is retracted by a spring the same as with the previously described water motor. Shaft 196 is journaled to the frame 140. Sprocket 152 is attached to the shaft 196 as is the ratchet 148. Chain 150 extends around sprocket 152 and a sprocket mounted on power shaft 154. With the exception of the more sturdy frame and the water motor 146 and chain 150, the power vehicle is identical with all other vehicles 18 and therefore, the description of the vehicle following will be identical for all of them. Sprocket 156 is mounted for free rotation upon the power shaft 154. Dog clutch 158 is splined to the power shaft 154 so that it rotates with it, but is free to move axially along it. The position of the dog clutch 158 is controlled by bifurcated lever 160 which is pivoted to frame 140 of the vehicle. Therefore, it may be seen if the clutch is in contact with the sprocket 156 that it will rotate same. Chain 162 is trained around sprocket 156 and sprocket 164 upon jack shaft 166. The jack shaft 166 also has two small sprockets 168 by which chains 170 are trained around wheel sprockets 172 which are attached to the wheels 142. The wheel axles are mounted on arm 174 which is pivoted to the frame by vertical bolt 176. Therefore, if it is desired to move the entire system with the movable pipe 14 and vehicles 18 along the line longitudinally of the pipe 14, all the wheels may be rotated to a position to move in such a direction by rotating the arm 174 on the bolt 176. Of course, it is necessary to remove sprocket chains 170 to achieve this.

The dog clutch 158 may be disengaged from the sprocket 156 by moving the bifurcated lever 160 manually and a ring is pivoted to the frame to hold the lever in a disengaged position. Therefore, if one of the vehicles is out of line, the dog clutch 158 may be disengaged manually and the vehicle 18 aligned manually. Normally, the clutch 158 is held and engaged with the sprocket 156 by spring 180 extending from the end of the bifurcated lever 160 to a point on the frame 140.

Figure 11:
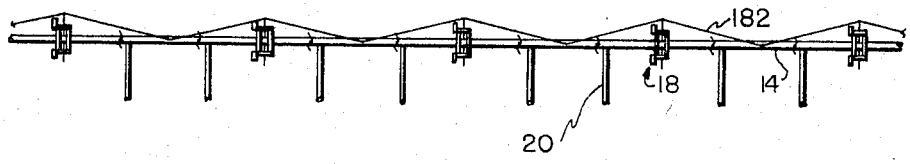
FIG. 11 is a schematic view of a line of pipe with the vehicles schematically showing the alignment control system.

Alignment sensing device in the form of alignment cable 182 is attached to the pipe 14 on either side of the vehicle 18 and extending over one end of cam bar 184. (Shown in FIGS. 9, 10 and 11, but not shown in FIG. 8 for simplicity.) Therefore, if the vehicle 18 gets in front of adjacent vehicles, the pipe will bend slightly and this bend in the pipe will cause the cam bar 184 to move rearwardly. Cam bar 184 is mounted for movement on the frame 140 so that cam 186 thereon will move the bifurcated lever 160 to disengage the clutch 158 from the sprocket 156. Therefore, since the vehicle 18 has no power moving it forward, it will remain stationary until the vehicle 18 again becomes aligned with remaining vehicles. At that time the spring 188 will move the cam bar forward to permit spring 180 to move the bifurcated lever 160 so that the clutch 158 again engages the sprocket 156 to put power on the vehicle 18 again.

Figure 12:
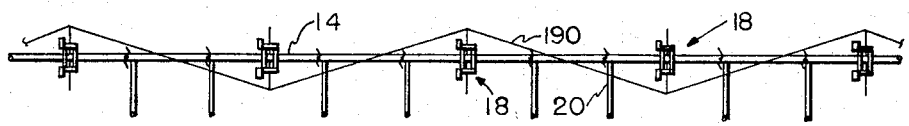
FIG. 12 is a view of the main sprinkler line with a series of vehicles showing the misalignment stop system.

FIG. 12 shows misalignment cable 190 which is attached to the extreme end of the movable pipe 14 and goes forward of one vehicle 18 and rearward of the adjacent vehicle 18. Therefore, it may be seen that if any vehicle 18 becomes misaligned, either in a forward or rearward direction, it will cause movement in the misalignment cable 190. The cable 190 is strung along the plurality of frames 140 mounted on the forward side of one of the vehicles 18 and the rear of the next.

Figures 13, 14:
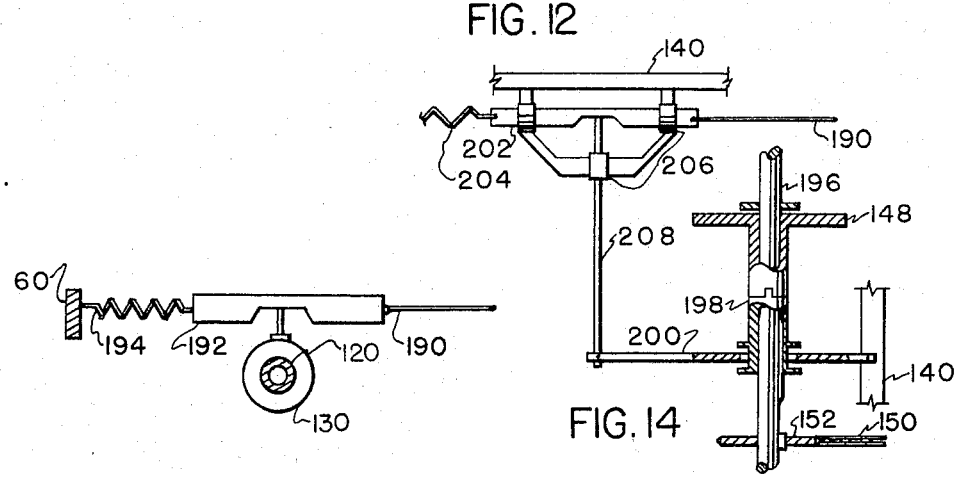
FIG. 13 is a partial sectional view showing the misalignment stop valve and actuating mechanism.
FIG. 14 is a partial sectional view showing a second embodiment of a misalignment stop mechanism.

In the embodiment seen in FIG. 13, the end of the misalignment cable 190 is connected to cam plate 192 on the pivot vehicle 24. Spring 194 extends from the frame 60 of the pivot vehicle to the end of the cam plate 192. The cam plate 192 has a cam surface which is in contact with the plunger of the misalignment valve 130 in line 120. As may be seen in FIG. 13, the configuration of the cam surface is such that if the cam plate 192 moves in either direction, that the plunger of valve 130 is depressed, thereby closing the valve 130 which shuts down the flow of water in line 120. As explained above, when the flow of water in 120 is shut down, the movement of the entire system is stopped although the water continues to flow in the movable pipe 14. Therefore, it may be seen that if gross misalignment results which is not accommodated by the alignment system, including the cable 182, the misalignment system with cable 190 will stop the movement of the entire system, while permitting the irrigation sprinklers to continue to water the land.

FIG. 14 shows a second embodiment of a mechanical structure by which the movement of the vehicles 18 is stopped. By this embodiment the power from the water motor 146 to the power shaft 154 is interrupted (FIGS. 8 and 14). The chain 150 is trained around sprocket 152 on jack shaft 196 which is inactivated by dog clutch 198. The ratchet 148 is, in this embodiment, mounted free to rotate on shaft 196. The dog clutch 198, keyed to shaft 196, is operated by lever 200 which is pivoted to frame 140 of the vehicle 18. The cable 190 is attached to cam plate 202 which is mounted for reciprocal movement and is normally held in position by tension spring 204. Bearings 206 hold the various parts in position. Inasmuch as the cam plate 202 has a similar shape as cam plate 192, it may be seen that if the cable 190 is either tensioned or relaxed the pitman 208 will move lever 200 to disengage clutch 198. Therefore, continued activation of the water motor 146 will cause the ratchet 148 to turn freely upon shaft 196 and will not result in movement of the power shaft 154. Therefore, it may be seen that I have provided mechanical means for inactivating the movement of the vehicles 18 in case of gross misalignment. It will also be understood that the movement of the pivot vehicle 24 could be stopped by a similar clutch arrangement upon the shaft of the drum of the moving winch 64.

It will be noted that the vehicles 18 are symmetrical except for the means for detecting misalignment which includes cable 182 and for the trail tubes 20. Therefore, if it is desired to reverse the vehicles, all that is necessary is to reverse the dogs on the ratchet 148, the trail tubes 20, and the means for detecting misalignment. The means for detecting misalignment 182 will be on the forward side of the vehicles.

It will be apparent that the embodiments shown are only exemplary and that various modifications can be made in construction, materials, and arrangement within the scope of the invention as defined in the appended claims.

I claim as my invention:

1. A means for transferring water from a fixed pipe to a movable pipe comprising:
   (a) a plurality of rigid pivot pipes,
   (b) each pivot pipe having a pivot on each end,
   (c) the pivots being means for connecting each pivot pipe to another pipe in series water transferring relation,
   (d) a cable extending along the series of pivot pipes,
   (e) said cable attached to one pivot of each pipe,
   (f) the length of the cable connected between two pivot points being shorter than the two pivot pipes, said length of cable spans so that three consecutive pivot points are never aligned, so arranged and constructed so that the ends of the series of pivot pipes may be connected to a fixed pipe and movable pipe and the series transformed from a folded relationship to an extended relationship by movement of the movable pipe.

2. A means for transferring water from a fixed pipe to a movable pipe comprising:
   (a) a plurality of rigid pivot pipes,
   (b) each pivot pipe having a pivot on each end,
   (c) the pivots being means for connecting each pivot pipe to another pipe structurally in series, and
   (d) each pivot being means for connecting each pivot pipe to another pipe in series water transferring relation,
   (e) each pivot having a vertical axis of rotation,
   (f) a ground engaging load bearing support wheel mounted to each pivot,
   (g) a cable extending along the series of pivot pipes attached to one pivot of each pipe,
   (h) the pivot at one end of the series of pivot pipes removably connected to said fixed pipe, and
   (i) one end of the series of pivot pipes connected to said movable pipe; so arranged and constructed that the pivot pipes may be transformed from a folded relationship to an extended relationship by movement of the movable pipe.

3. The invention as defined in claim 2 wherein
   (j) the length of the cable connected between two pivots is shorter than the two pivot pipes, said length of cable spans so that the cable prevents the pivot pipes from completely unfolding.

4. The invention as defined in claim 3 with the addition of
   (k) a painter for one pivot of each pipe,
   (l) one end of said painter attached to a point on the cable halfway between the pivots to which the cable is attached,
   (m) the other end of the painter attached to a spring,
   (n) said spring attached to a pivot pipe, (o) said painter extending around one of said pivots between its ends, so that the cable is folded when the pipe is folded.

5. The invention as defined in claim 2 wherein
(j) said wheels are mounted to caster about vertical axes.

6. The invention as defined in claim 2 with the addition of
(j) a vehicle upon which is mounted said movable pipe,
(k) a second cable,
(l) one end of said second cable attached to said pivot connected to said fixed pipe,
(m) a reel on the vehicle,
(n) the other end of the second cable attached to the reel so that by winding in the second cable, the pipes may be transformed from an extended relationship to a folded relationship.

7. The invention as defined in claim 6 with the addition of
(a) means on said vehicle for moving said vehicle, and
(b) means responsive to the full extension of said second cable for inactivating the means for moving said vehicle.

8. Means for supplying water intermittently to two or more water motors comprising:
(a) a pipe adapted to carry water under pressure,
(b) a pressure valve connected to the pipe,
(c) the outlet of said pressure valve connected to a first water motor,
(d) the outlet of said pressure valve also connected to the inlet of an exhaust valve,
(e) the outlet of the exhaust valve being vented to waste,
(f) said first motor being mechanically connected to close the pressure valve and open the exhaust valve when it is extended by the water pressure supplied by said pressure valve,
(g) spring means to return said first motor to a non-extended position,
(h) at its nonextended position said first motor closing said exhaust valve and opening said pressure valve; whereby one or more additional water motors may be attached to the outlet of the pressure valve and be powered thereby,
(i) a plurality of vehicles attached to said pipe supporting same,
(j) sprinkler means on said pipe for sprinkling water from the pipe onto the land,
(k) at least one additional water motor on at least one of said vehicles,
(l) said additional motor comprising a piston-cylinder,
(m) said additional motor connected to the output of said pressure valve,
(n) a spring for returning the piston to the opposite direction from that to which water pushes it,
(o) means for connecting the additional motor to the wheels of the vehicles for rotating the wheels of the vehicles responsive to operation of the motor,
(p) a valve in the connection from the outlet of the pressure valve to said first motor, and
(q) means for detecting gross misalignment of said vehicles,
(r) said valve in said connection responsive to said means for detecting gross misalignment; so that if gross misalignment results, the valve is closed thus ceasing the cycling of the pressure and exhaust valves, thus ceasing the movement of the vehicles.

9. The invention as defined in claim 8 wherein the means for detecting gross misalignment includes
(s) a cable,
(t) one end of said cable attached to one end of said pipe,
(u) said cable extending to the forward end of one vehicle and to the after end of the adjacent vehicle,
(v) the other end of said cable attached to a cam plate, and
(w) a spring attaching the cam plate to the end vehicle so that if any vehicle is misaligned that said spring will contract or extend,
(x) said cam plate operating said valve in said connection.

10. Means for supplying water intermittently to one or more water motors comprising:
(a) a pipe adapted to carry water under pressure,
(b) a pressure valve connected to the pipe,
(c) the outlet of said pressure valve connected to a first water motor,
(d) the outlet of said pressure valve also connected to the inlet of an exhaust valve,
(e) the outlet of the exhaust valve being vented to waste,
(f) said first motor being mechanically connected to close the pressure valve and open the exhaust valve when it is extended by the water pressure supplied by said pressure valve,
(g) spring means to return said first motor to a non-extended position,
(h) at its nonextended position said first motor closing said exhaust valve and opening said pressure valve; whereby one or more additional water motors may be attached to the outlet of the pressure valve and be powered thereby,
(i) a vehicle,
(j) said first motor, pressure valve, and exhaust valve mounted on said vehicle,
(k) said pipe connected to a plurality of rigid pivot pipes,
(l) each pivot pipe having a pivot on each end,
(m) the pivots being means for connecting each pivot pipe to another pivot pipe in series water transferring relationship,
(n) a winch on the vehicle,
(o) a cable extending from the winch to the end of the pivot pipes,
(p) a valve in said connection from the outlet of the pressure valve to said first motor, and
(q) means responsive to the extending of the cable for closing the valve.

11. In an agricultural irrigation system having
(a) pipe adapted to carry water under pressure,
(b) a plurality of means for sprinkling water from said pipe onto the land to be watered,
(c) a plurality of vehicles supporting said pipe,
(d) a shaft extending along the pipe connecting some vehicles to other vehicles, and
(e) means for rotating said shaft; the improvement comprising:
(f) a sprocket on said shaft,
(g) said sprocket rotating freely on said shaft,
(h) a clutch splined to said shaft so that said clutch rotates with said shaft,
(i) means for moving said vehicle responsive to rotation of said sprocket, and
(j) means for moving said clutch into driving engagement with said sprocket so that when said clutch is engaged with a sprocket, that said sprocket rotates with said shaft.

12. The invention as defined in claim 11 with the addition of
(k) means on each vehicle for determining if said vehicle is ahead of adjacent vehicles, and
(l) means for disengaging said clutch responsive to said means for detecting if said vehicle is forward of the adjacent vehicles.

13. The invention as defined in claim 12 wherein
(m) one vehicle has a winch mounted thereon,
(n) a cable attached to said winch and extending forward, and
(o) means for rotating said winch,
so that said vehicle with a winch moves forward at a set rate unaffected by the alignment of the other vehicles.

14. The invention as defined in claim 13 with the addition of
(p) said pipe connected to a plurality of rigid pivot pipes at said vehicle having a winch,
(q) each pivot pipe having a pivot on each end,
(r) the pivots being means for connecting each pivot pipe to another pivot pipe in series water transferring relationship,
said winch furnishing the power to extend the plurality of pivot pipes.

References Cited by the Examiner

UNITED STATES PATENTS

| | | | |
|---|---|---|---|
| 1,943,152 | 1/1934 | Weiss | 239—1 |
| 2,150,583 | 3/1939 | Long | 285—185 X |
| 2,392,408 | 1/1946 | Radonich | 239—1 |
| 2,726,895 | 12/1955 | Behlen | 239—212 X |
| 2,879,083 | 3/1959 | Corsette | 285—114 |
| 2,940,672 | 6/1960 | Gaskell | 239—212 |
| 2,941,727 | 6/1960 | Zybach | 239—212 X |
| 2,946,515 | 7/1960 | Jensen | 239—212 |
| 3,001,721 | 9/1961 | Zybach | 239—177 |

FOREIGN PATENTS 456,906  11/1936  Great Britain.

M. HENSON WOOD, Jr., *Primary Examiner.*
EVERETT W. KIRBY, *Examiner.*
D. L. MOSELEY, V. C. WILKS, *Assistant Examiners.*